(12) United States Patent
Fey

(10) Patent No.: US 11,933,239 B2
(45) Date of Patent: Mar. 19, 2024

(54) METHOD, PROCESSING UNIT, AND COMPUTER PROGRAM FOR OPERATING AN INTERNAL COMBUSTION ENGINE HAVING AT LEAST ONE CATALYTIC CONVERTER

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/844,177

(22) Filed: Jun. 20, 2022

(65) Prior Publication Data

US 2023/0024946 A1   Jan. 26, 2023

(30) Foreign Application Priority Data

Jul. 20, 2021 (DE) .......................... 102021207721.8

(51) Int. Cl.
  *F02D 41/14* (2006.01)
  *F02D 41/02* (2006.01)
  *F01N 3/10* (2006.01)

(52) U.S. Cl.
  CPC ..... *F02D 41/1454* (2013.01); *F02D 41/0295* (2013.01); *F02D 41/1445* (2013.01);
  (Continued)

(58) Field of Classification Search
  CPC ........... F01N 2430/06; F01N 2560/025; F01N 2560/14; F01N 2900/0416; F01N 3/021;
  F01N 3/10; F01N 9/00; F02D 2041/1433; F02D 2200/0814; F02D 41/0295; F02D 41/1441; F02D 41/1445; F02D 41/1446;
  (Continued)

(56) References Cited

U.S. PATENT DOCUMENTS

2020/0208585 A1*  7/2020  Fey .................... F02D 41/1441

FOREIGN PATENT DOCUMENTS

DE   102016222418 A1   5/2018
DE   102018208683 A1   12/2019
(Continued)

*Primary Examiner* — Phutthiwat Wongwian
*Assistant Examiner* — Diem T Tran
(74) *Attorney, Agent, or Firm* — Michael Best & Friedrich LLP

(57) ABSTRACT

A method is directed to operating an internal combustion engine having at least one catalytic converter, wherein control interventions of a lambda control for controlling an exhaust gas composition of the engine are deactivated. The method includes the steps of ascertaining a current exhaust gas composition upstream of the catalytic converter, determining a current oxygen fill level of the catalytic converter on the basis of the ascertained current exhaust gas composition, ascertaining a planned control intervention on a composition of an air-fuel mixture supplied to the engine on the basis of the determined current oxygen fill level of the catalytic converter, ascertaining a current exhaust gas composition downstream of the catalytic converter, ascertaining a future exhaust gas composition downstream of the catalytic converter resulting on the basis of an air-fuel mixture already supplied to the engine, and reactivating the lambda control and specifying a control intervention to be carried out.

10 Claims, 2 Drawing Sheets

(52) U.S. Cl.
CPC ............ *F02D 41/1475* (2013.01); *F01N 3/10* (2013.01); *F01N 2560/025* (2013.01); *F01N 2900/0416* (2013.01); *F02D 2200/0814* (2013.01)

(58) Field of Classification Search
CPC ............ F02D 41/1454; F02D 41/1475; F02D 41/1488; Y02T 10/12; Y02T 10/40
See application file for complete search history.

(56) References Cited

FOREIGN PATENT DOCUMENTS

| | | |
|---|---|---|
| DE | 102018217307 A1 | 4/2020 |
| DE | 102018251725 A1 | 7/2020 |

\* cited by examiner

METHOD, PROCESSING UNIT, AND COMPUTER PROGRAM FOR OPERATING AN INTERNAL COMBUSTION ENGINE HAVING AT LEAST ONE CATALYTIC CONVERTER

BACKGROUND OF THE INVENTION

The present invention relates to a method for operating an internal combustion engine having at least one catalytic converter and also to a processing unit and to a computer program for carrying out the method.

In the event of incomplete combustion of the fuel-air mixture in a gasoline engine, in addition to nitrogen ($N_2$), carbon dioxide ($CO_2$), and water ($H_2O$), a variety of combustion products are emitted, of which hydrocarbons (HC), carbon monoxide (CO), and nitrogen oxides ($NO_x$) are legally limited. The applicable exhaust gas limiting values for motor vehicles typically can only be maintained using a catalytic exhaust gas posttreatment. The mentioned pollutant components can be converted by using a three-way catalytic converter.

A simultaneously high conversion rate for HC, CO, and $NO_x$ is only achieved in three-way catalytic converters in a narrow range around the stoichiometric operating point (lambda=1), the so-called "catalytic converter window".

A lambda control, which is based on the signals of lambda sensors before and after the catalytic converter, is typically used to operate the catalytic converter in the catalytic converter window. For the control of the lambda value before the catalytic converter, the oxygen content of the exhaust gas before the catalytic converter is measured using a lambda sensor. As a function of this measured value, the control corrects the fuel quantity from the mixture pilot control. For more accurate control, the exhaust gas is additionally analyzed after the catalytic converter using a further lambda sensor. This signal is used for a reference control which is superimposed on the lambda control before the catalytic converter. In general a switch-type lambda sensor is used as the lambda sensor after the catalytic converter, which has a very steep characteristic curve at lambda=1 and can therefore indicate lambda=1 very accurately.

In addition to the reference control, which generally only adjusts small deviations from lambda=1 and is designed to be comparatively slow, after large deviations from lambda=1, a lambda pilot control can be used to reach the catalytic converter window again quickly, for example, after phases having overrun cutoff ("catalytic converter clearance").

Such control concepts have the disadvantage that they only recognize leaving the catalytic converter window late on the basis of the voltage of the switch-type lambda sensor after the catalytic converter.

An alternative to the control of the three-way catalytic converter on the basis of the signal of a lambda sensor after the catalytic converter is a control of the average oxygen fill level of the catalytic converter. Since this average fill level is not measurable, it can only be modeled. A corresponding model-based control of the fill level of a three-way catalytic converter is described in DE 10 2016 222 418 A1. A pilot control for a model-based control of the fill level of a three-way catalytic converter is described in DE 10 2018 208 683 A1, a model-based prediction of the pilot control lambda value required upon reintroduction after a phase with inactive control intervention is described in DE 10 2018 217 307 A1.

SUMMARY OF THE INVENTION

According to the invention, a method for operating an internal combustion engine having at least one catalytic converter, and a processing unit and a computer program for carrying out the method.

A method according to the invention for operating an internal combustion engine having at least one catalytic converter, wherein control interventions of a lambda control for controlling an exhaust gas composition of the internal combustion engine are deactivated, comprises ascertaining a current exhaust gas composition upstream of the at least one catalytic converter, determining a current oxygen fill level of the at least one catalytic converter on the basis of the ascertained current exhaust gas composition, ascertaining a current exhaust gas composition downstream of the at least one catalytic converter, ascertaining a planned control intervention on a composition of an air-fuel mixture supplied to the internal combustion engine on the basis of the determined current oxygen fill level of the at least one catalytic converter, ascertaining a current exhaust gas composition downstream of the at least one catalytic converter, ascertaining a future exhaust gas composition, which results due to an air-fuel mixture already supplied to the internal combustion engine, downstream of the at least one catalytic converter, and reactivating the lambda control and specifying a control intervention to be carried out as a function of the planned control intervention and the current exhaust gas composition downstream of the at least one catalytic converter, and/or as a function of the planned control intervention and the future exhaust gas composition. A possible error in the planned control intervention, which can be based, for example, on imprecise model assumptions, can thus be corrected to reinitialize the lambda control as much as possible without disadvantageous effects on the emission behavior after an inactive control intervention. In such situations, a misjudgment of the oxygen fill level is particularly probable and therefore also a misjudgment of the planned control intervention.

The ascertainment of the future exhaust gas composition, which results due to an air-fuel mixture already supplied to the internal combustion engine, downstream of the at least one catalytic converter preferably comprises the ascertainment of the exhaust gas composition downstream of the at least one catalytic converter for a time period, the duration of which corresponds to a flow duration of the exhaust gas of the internal combustion engine for flowing through a flow path from the internal combustion engine to downstream of the at least one catalytic converter. Situations in which the exhaust gas composition downstream of the catalytic converter cannot yet reflect possible changes of the air-fuel mixture due to an excessively long dead time or gas running time are thus taken into consideration correctly in the establishment of the control intervention.

In particular, the ascertainment of the planned control intervention can comprise a categorization, in particular into one or more categories from lean adjustment, enrichment, and stoichiometric demand. An assignment of relevant events of the chronological development is thus facilitated.

In advantageous embodiments of the method, a control intervention to be carried out opposing the planned control intervention is specified if the current exhaust gas composition corresponds to an exhaust gas composition producible by the planned control intervention and simultaneously the future exhaust gas composition does not already correspond to an exhaust gas composition producible by the planned control intervention. Thus, for example, if a lean air-fuel mixture is planned due to the calculated fill level, but the current exhaust gas composition downstream of the catalytic converter is already lean and the future exhaust gas composition downstream of the catalytic converter does not lead an expectation of rich exhaust gas (or is also lean), a rich air-fuel mixture is specified.

Alternatively or additionally, a control intervention to be carried out corresponding to the planned control intervention can be specified if the current exhaust gas composition corresponds to an exhaust gas composition resulting due to an opposing control intervention. Thus, for example, if a lean air-fuel mixture is planned on the basis of the calculated fill level and the current exhaust gas composition downstream of the catalytic converter is rich, a lean air-fuel mixture is specified.

Alternatively or additionally, a control intervention to be carried out corresponding to the planned control intervention can be specified if the future exhaust gas composition already corresponds to an exhaust gas composition producible by the planned control intervention. Thus, for example, if a lean air-fuel mixture is planned on the basis of the calculated fill level and the future exhaust gas composition downstream of the catalytic converter is rich, a lean air-fuel mixture is specified.

The three mentioned options can prevent a misjudgment of the planned control intervention from resulting in worsened emission behavior.

In the time period without active control intervention, in particular one or more from the group made up of an overrun or coasting operation of the internal combustion engine, a component protection function, and a (partial) combustion chamber shutdown are carried out. In such situations, the oxygen fill level of the catalytic converter may change strongly, so that these situations have particular relevance with respect to the emission behavior upon the reactivation of the lambda control.

The current and/or future exhaust gas composition is preferably ascertained by means of a sensor, in particular one or more lambda sensors. This is a particularly robust method, wherein such sensors are provided in any case due to legal requirements, so that no additional cost expenditure also results in this way.

A processing unit according to the invention, for example, a control unit of a motor vehicle, is configured, in particular by programming, to carry out a method according to the invention.

The implementation of a method according to the invention in the form of a computer program or computer program product having program code for carrying out all method steps is also advantageous, since this causes particularly low costs, in particular if an executing control unit is also used for further tasks and is therefore provided in any case. Finally, a machine-readable storage medium is provided having a computer program stored thereon as described above. Suitable storage media or data carriers for providing the computer program are in particular magnetic, optical, and electrical memories, e.g., hard drives, flash memories, EEPROMs, DVDs, and others. A download of a program via computer networks (Internet, intranet, etc.) is also possible. Such a download can take place in a wired or wireless manner (e.g., via a WLAN network, a 3G, 4G, 5G, or 6G connection, etc.).

BRIEF DESCRIPTION OF THE DRAWINGS

Further advantages and embodiments of the invention result from the description and the appended drawing.

The invention is schematically shown on the basis of an exemplary embodiment in the drawing and is described hereinafter with reference to the drawing.

DETAILED DESCRIPTION

Figure 1:
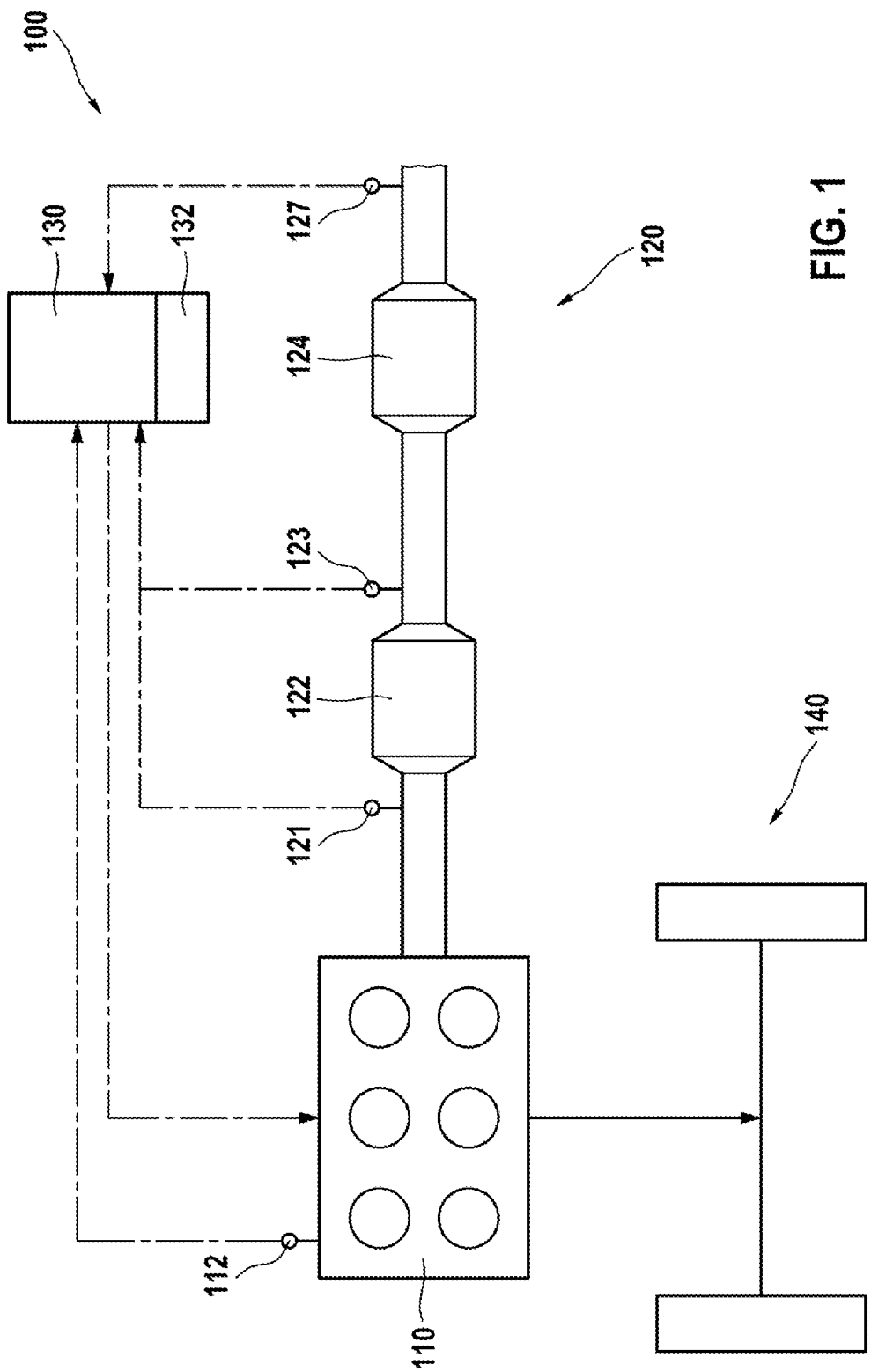
FIG. 1 schematically shows a vehicle having internal combustion engine and catalytic converter, as can be used in the scope of the present invention.

FIG. 1 schematically shows a vehicle, as can be used in the scope of the invention, which is identified as a whole by 100. The vehicle 100 comprises an internal combustion engine 110, having six indicated cylinders here, for example, an exhaust gas system 120, which has multiple purification components 122, 124, for example, catalytic converters and/or particle filters, and a processing unit 130, which is configured to control internal combustion engine 110 and exhaust gas system 120 and is connected thereto to transmit data. Furthermore, the processing unit 130 is connected to transmit data in the illustrated example to sensors 112, 121, 123, 127, which acquire operating parameters of the internal combustion engine 110 and/or the exhaust gas system 120. It is obvious that further sensors can be provided, which are not shown.

In the example illustrated here, the processing unit 130 comprises a data memory 132, in which, for example, processing rules and/or parameters (e.g., threshold values, characteristic variables of the internal combustion engine 110 and/or the exhaust gas system 120, or the like) can be stored.

The internal combustion engine 110 drives wheels 140 and in specific operating phases can also be driven by the wheels (for example, so-called overrun operation).

Figure 2:
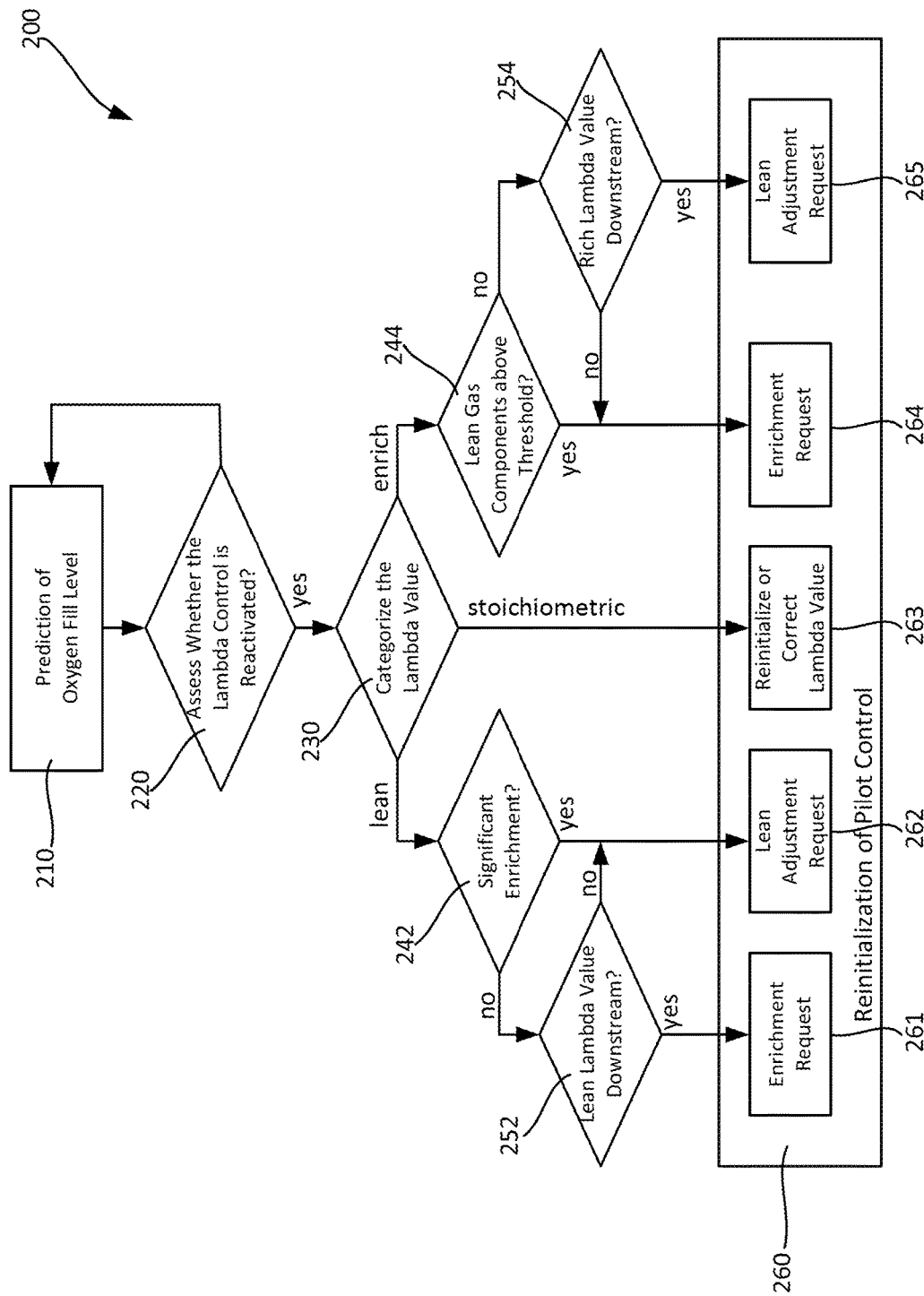
FIG. 2 shows an advantageous embodiment of a method according to the invention in the form of a very simplified flow chart.

In FIG. 2, an advantageous embodiment of a method according to the invention is schematically shown in the form of a flow chart and is identified as a whole by 200.

References to components of a vehicle or a part of a vehicle used in the description of the method 200 relate in particular to the vehicle 100 shown in FIG. 1.

The method 200 can be used in particular in conjunction with a model-based lambda control of the operation of the internal combustion engine 110. Such a model-based lambda control can comprise, for example, the following partial functionalities:
  system model
  prefilter
  pilot control
  fill level regulator
  adaptation,
wherein the method 200 relates in particular to the pilot control.

Since the oxygen fill level of the catalytic converter 122 cannot be measured, it is modeled with the aid of a system model. The signal of the lambda sensor 121 before the catalytic converter 122 is converted into one or more input variables for a fill level model of the catalytic converter. In other words, a current exhaust gas composition upstream of the catalytic converter 122 is thus ascertained and a current oxygen fill level of the catalytic converter 122 is determined on the basis of the ascertained current exhaust gas composition.

It is advantageous to convert the signal of the lambda sensor 121 into the concentration of one or more exhaust gas components. For example, a conversion of the lambda value into the concentrations of oxygen ($O_2$), carbon monoxide (CO), hydrogen ($H_2$), and hydrocarbons (HC) before the catalytic converter 122 with the aid of an input emission model is advantageous.

At least one fill level of the catalytic converter is modeled using the variables calculated by the input emission model and possibly additional input variables (for example, exhaust gas or catalytic converter temperatures, exhaust gas mass flow, and current maximum oxygen storage capacity of the catalytic converter 122). To be able to map filling and emptying processes more realistically, the catalytic converter 122 is preferably divided into multiple (axial) zones, and the concentrations of the individual exhaust gas components are ascertained with the aid of reaction kinetics for each of these zones. These can in turn each be converted into a fill level of the individual zones, preferably the oxygen fill level scaled to the current maximum oxygen storage capacity. The fill levels of individual or all zones can be combined by means of suitable weighting to form an overall fill level, which reflects the state of the catalytic converter 122. For example, the fill levels of all zones can in the simplest case be weighted equally and thus an average fill level can be ascertained. However, it is also possible to take into consideration using suitable weighting that for the instantaneous exhaust gas composition after the catalytic converter 122, the fill level in a comparatively small region at the outlet of the catalytic converter 122 is decisive, while for the development of the fill level in this small region at the outlet of the catalytic converter 122, the fill level in the volume lying before it and its development is decisive. For the sake of simplicity, an average oxygen fill level is assumed hereinafter.

The concentrations of the individual exhaust gas components at the outlet of the catalytic converter 122 calculated with the aid of the catalytic converter model are converted for the adaptation of the system model into a signal which can be compared to the signal of an exhaust gas sensor 123 after the catalytic converter. Preferably, the lambda value after the catalytic converter 122 is modeled.

The pilot control 200 can be designed, for example, essentially as an inversion of the system model. This has the advantage that the controller only has to engage when the fill level of the catalytic converter 122 modeled with the aid of the system model deviates from a setpoint fill level trajectory, which is calculated by the pilot control 200. While the system model converts the input lambda before the catalytic converter 122 into an average oxygen fill level of the catalytic converter 122, the pilot control 200 converts the average setpoint oxygen fill level into a corresponding setpoint lambda value before the catalytic converter 122. The setpoint fill level trajectory takes into consideration that the permissible lambda control range is restricted for various reasons, for example, minimizing emissions and drivability. The average setpoint oxygen fill level therefore cannot be reached arbitrarily quickly.

The system model is preferably analytically inverted. However, a catalytic converter 122 is a complex, nonlinear system having time-variant system parameters, which can generally only be represented by a nonlinear differential equation system. This typically has the result that the equation system for the inverted system model cannot be solved analytically. Therefore, as an alternative to the analytic inversion of the system model, a numeric inversion of the system model is also possible.

With inactive control intervention (i.e., with deactivated lambda control), the pilot control observes the input lambda measured with the aid of the lambda sensor 121 before the catalytic converter 122, but cannot actively influence it. The observation takes place so that the pilot control can immediately specify an optimum trajectory upon the reactivation of the control intervention.

Upon the reactivation of the control intervention, a residual exhaust gas quantity is located between the respective combustion chamber of the internal combustion engine 110 and the lambda sensor 121 before the catalytic converter 122, which can no longer be observed by the pilot control, since this already has to specify a pilot control lambda value and a trajectory for the oxygen fill level matching thereto. To achieve optimum switching on and adjustment behavior upon a reactivation of the control intervention, the non-observable residual exhaust gas quantity is taken into consideration in that the change of the oxygen fill level which will result during the transport process of the residual exhaust gas quantity from the combustion chamber to the lambda sensor 121 before the catalytic converter 122 is predicted with the aid of the system model in the context of a prediction step 210 of the method 200. The pilot control uses the predicted oxygen fill level for the reinitialization of the trajectory at the point in time of the restarting after a phase having inactive control intervention and calculates the pilot control lambda matching thereto.

The average oxygen fill level modeled with the aid of the system model is adjusted to a setpoint value which minimizes the probability of breakthroughs of lean and rich exhaust gas through the catalytic converter 122 and thus results in minimal emissions. The setpoint value is preferably prefiltered. On the one hand, the pilot control and, on the other hand, a controller are fed with the prefiltered setpoint value for the oxygen fill level as a reference variable. The output signals of the pilot control and the controller are summed. The summation signal represents the setpoint lambda before the catalytic converter 122.

Since the input variables of the system model, in particular the signal of the lambda sensor 121 before the catalytic converter, are subject to uncertainties, the system model is preferably adapted. The pilot control and possibly controller parameters can also be adapted. Such an adaptation is described, for example, in DE 10 2018 251 725 A1.

As described above, the pilot control and the prediction 210 are based on the system model. The accuracy of the pilot control is thus dependent on the accuracies of the measured variables and model variables, which are incorporated in the system modeling. Inaccuracies of these variables and model simplifications in relation to the real system can have the result that the predicted oxygen fill level of the catalytic converter does not correspond to the actual one upon restarting after a phase having inactive control intervention.

After a phase having inactive control intervention, the catalytic converter 122 is generally outside the catalytic converter window (state having fill level suitable for pollutant conversion), for example, after an overrun cutoff or after a lambda adjustment for the component protection. The restarting after such a phase is therefore especially emission relevant. The catalytic converter 122 has to be brought as quickly as possible back into the catalytic converter window to ensure the optimum conversion of the exhaust gas. An incorrect prediction 210 of the oxygen fill level is absolutely to be avoided, since this would result in an unsuitable reinitialization of the trajectory for the oxygen fill level and thus in an unsuitable pilot control lambda upon restarting. In the worst case, lean adjustment could occur, although the actual oxygen fill level of the catalytic converter is already too high or enrichment when the oxygen fill level is already too low, respectively. This would result in elevated $NO_x$ emissions or elevated CO and HC emissions, respectively.

To prevent this, the method 200 provides a plausibility check of the predicted oxygen fill level or the associated expected or planned pilot control lambda value with the aid of a sensor 123 after the catalytic converter. This sensor 123 is preferably a switch-type lambda sensor after the catalytic converter 122.

Since the effects of an incorrect prediction 210 of the oxygen fill level in the case of very high or very low modeled oxygen fill level are particularly high, the plausibility check 200 can optionally be restricted to such situations.

The plausibility check 200 of the expected or planned pilot control lambda value is carried out in particular if it is recognized in an assessment step 220 that the lambda control or the pilot control is reactivated. For this purpose, for example, operating parameters of the internal combustion engine 110 can be evaluated (e.g., speed, load requirement, fuel mass flow, throttle valve positioning, or the like). Signals of other vehicle components which are received, for example, via a vehicle-internal data network (for example CAN) can also indicate a reactivation of the lambda control.

In a categorization 230, the expected or planned pilot control lambda value is preferably categorized in one of the three categories "lean adjustment", "stoichiometric request", or "enrichment". In the case of a categorization as lean adjustment, i.e., if a high expected or planned oxygen fill level or a lean expected or planned pilot control lambda value results from the prediction 210, it is ascertained in a first plausibility check step 242 whether a significant enrichment has taken place within a time period before the reactivation of the lambda control, which is required for an exhaust gas transport from the internal combustion engine 110 to the lambda sensor 123 downstream of the catalytic converter 122. For this purpose, for example, simultaneously with the prediction 210 or in its context, a composition of the air-fuel mixture supplied to the internal combustion engine 110 can be observed. If a proportion of rich gas components in the exhaust gas of the internal combustion engine produced thereby is above a threshold value (for example, at least 3%, 5%, or 7% of the total exhaust gas mass flow in the relevant time period), a reinitialization 260 of the pilot control using a correspondingly high pilot control lambda value or a lean adjustment request 262 can take place.

In contrast, if it is established that in the relevant time period rich gas components in the exhaust gas do not exceed or have not exceeded the threshold value, it is checked in a second plausibility check step 252 whether the lambda sensor 123 indicates a lean lambda value downstream of the catalytic converter 122. If this is the case, it has to be assumed that the prediction 210 of the pilot control lambda value or the oxygen fill level was incorrect. Therefore, in this case the reinitialization 260 is carried out using a low pilot control lambda value or an enrichment request 261. In contrast, if a lean lambda value has not been established downstream of the catalytic converter 122 in the second plausibility check step 252, an essentially correct result of the prediction 210 can be assumed, so that the lean adjustment request 262 can be used for the reinitialization 260 of the pilot control.

Similarly thereto, in the case of a categorization 230 as an enrichment it can be ascertained in the context of a first plausibility check step 244 whether a significant lean adjustment has taken place within the time period before the reactivation of the lambda control, which is required for the exhaust gas transport from the internal combustion engine 110 to the lambda sensor 123 downstream of the catalytic converter 122. If a proportion of lean gas components in the exhaust gas of the internal combustion engine 110 produced thereby is above a threshold value (for example, at least 3%, 5%, or 7% of the total exhaust gas mass flow in the relevant time period), the reinitialization 260 of the pilot control can take place using a correspondingly low pilot control lambda value or an enrichment request 264. This enrichment request 264 can correspond to the enrichment request 261, which is used in the above-described case of a failed plausibility check of the prediction 210 of a lean adjustment request. However, a separate rich pilot control lambda value 264, which differs from the rich pilot control lambda value 261, can also be selected.

In contrast, if it is established in the context of the first plausibility check step 244 that in the relevant time period lean gas components in the exhaust gas do not exceed or have not exceeded the threshold value, it is checked in a second plausibility check step 254 whether the lambda sensor 123 downstream of the catalytic converter 122 indicates a rich lambda value. If this is the case, it has to be assumed that the prediction 210 of the pilot control lambda value or the oxygen fill level was incorrect. Therefore, in this case the reinitialization 260 is carried out using a high pilot control lambda value or a lean adjustment request 265, which can correspond to the above-explained lean adjustment request 262 or can differ therefrom. In contrast, if a rich lambda value has not been established downstream of the catalytic converter 122 in the second plausibility check step 254, an essentially correct result of the prediction 210 can be assumed, so that the enrichment request 264 can be used for the reinitialization 260 of the lambda control or its pilot control.

If an essentially stoichiometric pilot control lambda value is ascertained as predicted in the categorization 230, this can be used, for example, directly as an initialization value 263 for reinitializing 260 the lambda control or its pilot control, since in this case a massive misjudgment is not a concern, so that the control can be sufficient here to reach the catalytic converter window quickly. However, it can also be advantageous in such a case to provide at least one plausibility check step, in particular a second plausibility check step for checking the lambda value downstream of the catalytic converter 122, in order to be able to provide a correspondingly corrected pilot control lambda value 263 in the case of an exhaust gas lambda value located strongly in the lean range or strongly in the rich range.

Therefore, in all situations a breakthrough of rich or lean exhaust gas through the catalytic converter 122 upon restarting of the pilot control after an operational-related interruption can be reliably prevented, which has a positive effect overall on the emission behavior of the vehicle 100.

Situations in which the plausibility check with the aid of the sensor after the catalytic converter could result in an incorrect result, namely if shortly before the restarting, a mixture change having a large absolute value (for example, typically greater than 5%) has taken place opposite to the current exhaust gas lambda value (sensor 123) after the catalytic converter 122 and the gas runtime between the combustion chamber and the sensor 123 after the catalytic converter 122 is longer than the time between the mixture change and the restarting, are covered by the respective first plausibility check step 242, 244. In these cases, the sensor 123 could not yet react to the mixture change and there is the possibility that a rich or lean exhaust gas lambda value is already present before or in the catalytic converter 122, although the sensor 123 after the catalytic converter 122 still indicates a lean or rich exhaust gas.

Large mixture changes are to be expected, for example, in the context of combustion chamber shutdowns (for example, for gear change assistance) in which oxygen is increasingly introduced into the catalytic converter 122, or of rich component protection, in which oxygen is increasingly discharged from the catalytic converter 122.

In contrast, if such a mixture change is small in absolute value (for example less than 3%), the sensor 123 after the catalytic converter 122 also cannot react thereto within the gas runtime between the combustion chamber and the sensor 123, but in this case due to the storage capacity of the catalytic converter 122, it can be assumed that the sensor 123 after the catalytic converter 122 will not indicate a different direction of the exhaust gas lambda value (rich or lean) than is actually present before or in the catalytic converter 122, so that the respective second plausibility check step 252, 254 of the predicted pilot control lambda value using the signal of the sensor 123 after the catalytic converter 122 will not result in a misjudgment. The selection of the threshold value can accordingly be oriented to the storage capacity of the respective catalytic converter 122 used.

The invention claimed is:

1. A method for operating an internal combustion engine having at least one catalytic converter, wherein control interventions of a lambda control for controlling an exhaust gas composition of the internal combustion engine are deactivated, comprising:
   ascertaining a current exhaust gas composition upstream of the at least one catalytic converter,
   determining a current oxygen fill level of the at least one catalytic converter on the basis of the ascertained current exhaust gas composition,
   ascertaining a planned control intervention on a composition of an air-fuel mixture supplied to the internal combustion engine on the basis of the determined current oxygen fill level of the at least one catalytic converter,
   ascertaining a current exhaust gas composition downstream of the at least one catalytic converter,
   ascertaining a future exhaust gas composition downstream of the at least one catalytic converter resulting on the basis of an air-fuel mixture already supplied to the internal combustion engine, and
   reactivating the lambda control and specifying a control intervention to be carried out as a function of the planned control intervention and the current exhaust gas composition downstream of the at least one catalytic converter, and/or as a function of the planned control intervention and the future exhaust gas composition.

2. The method according to claim 1, wherein the ascertainment of the future exhaust gas composition downstream of the at least one catalytic converter resulting on the basis of an air-fuel mixture already supplied to the internal combustion engine comprises the ascertainment of the exhaust gas composition downstream of the at least one catalytic converter for a time period, the duration of which corresponds to a flow duration of the exhaust gas of the internal combustion engine for flowing through a flow path from the internal combustion engine to downstream of the at least one catalytic converter.

3. The method according to claim 1, wherein the ascertainment of the planned control intervention comprises a categorization, into one or more categories from lean adjustment, enrichment, and stoichiometric request.

4. The method according to claim 1, wherein a control intervention to be carried out opposing the planned control intervention is specified when the current exhaust gas composition downstream of the at least one catalytic converter corresponds to an exhaust gas composition producible by the planned control intervention and simultaneously the future exhaust gas composition does not already correspond to an exhaust gas composition producible by the opposing control intervention.

5. The method according to claim 1, wherein a control intervention to be carried out corresponding to the planned control intervention is specified when the current exhaust gas composition corresponds to an exhaust gas composition resulting due to an opposing control intervention.

6. The method according to claim 1, wherein a control intervention to be carried out corresponding to the planned control intervention is specified when the future exhaust gas composition corresponds to an exhaust gas composition resulting due to an opposing control intervention.

7. The method according to claim 1, wherein in the time period without active control intervention, one or more from the group made up of an overrun or coasting operation of the internal combustion engine, a component protection function, and a (partial) combustion chamber shutdown are carried out.

8. The method according to claim 1, wherein the current exhaust gas composition and/or the future exhaust gas composition are ascertained by means of a sensor.

9. A processing unit for an exhaust system having at least one catalytic converter, wherein control interventions of a lambda control for controlling an exhaust gas composition of an internal combustion engine are deactivated, the processing unit configured to:
   ascertain a current exhaust gas composition upstream of the at least one catalytic converter,
   determine a current oxygen fill level of the at least one catalytic converter on the basis of the ascertained current exhaust gas composition,
   ascertain a planned control intervention on a composition of an air-fuel mixture supplied to the internal combustion engine on the basis of the determined current oxygen fill level of the at least one catalytic converter,
   ascertain a current exhaust gas composition downstream of the at least one catalytic converter,
   ascertain a future exhaust gas composition downstream of the at least one catalytic converter resulting on the basis of an air-fuel mixture already supplied to the internal combustion engine, and
   reactivate the lambda control and specifying a control intervention to be carried out as a function of the planned control intervention and the current exhaust gas composition downstream of the at least one catalytic converter, and/or as a function of the planned control intervention and the future exhaust gas composition.

10. A computer-readable storage medium containing instructions that are executable by a computer of an exhaust system having at least one catalytic converter, wherein control interventions of a lambda control for controlling an exhaust gas composition of an internal combustion engine are deactivated, wherein the instructions are executable to cause the computer to
   ascertain a current exhaust gas composition upstream of the at least one catalytic converter, determine a current oxygen fill level of the at least one catalytic converter on the basis of the ascertained current exhaust gas composition, ascertain a planned control intervention on a composition of an air-fuel mixture supplied to the internal combustion engine on the basis of the determined current oxygen fill level of the at least one catalytic converter, ascertain a current exhaust gas composition downstream of the at least one catalytic converter, ascertain a future exhaust gas composition downstream of the at least one catalytic converter resulting on the basis of an air-fuel mixture already supplied to the internal combustion engine, and reactivate the lambda control and specifying a control intervention to be carried out as a function of the planned control intervention and the current exhaust gas composition downstream of the at least one catalytic converter, and/or as a function of the planned control intervention and the future exhaust gas composition.

* * * * *